June 18, 1935. W. H. SPIRE Re. 19,616

METHOD OF AND APPARATUS FOR FORGING UPSET ARTICLES

Original Filed April 25, 1929 3 Sheets-Sheet 1

Inventor

William Henry Spire

By Bates, Golrick & Teare

Attorneys

June 18, 1935. W. H. SPIRE Re. 19,616

METHOD OF AND APPARATUS FOR FORGING UPSET ARTICLES

Original Filed April 25, 1929 3 Sheets-Sheet 2

Inventor

William Henry Spire

By Bates, Golrick & Teare

Attorneys

June 18, 1935. W. H. SPIRE Re. 19,616
METHOD OF AND APPARATUS FOR FORGING UPSET ARTICLES
Original Filed April 25, 1929 3 Sheets-Sheet 3
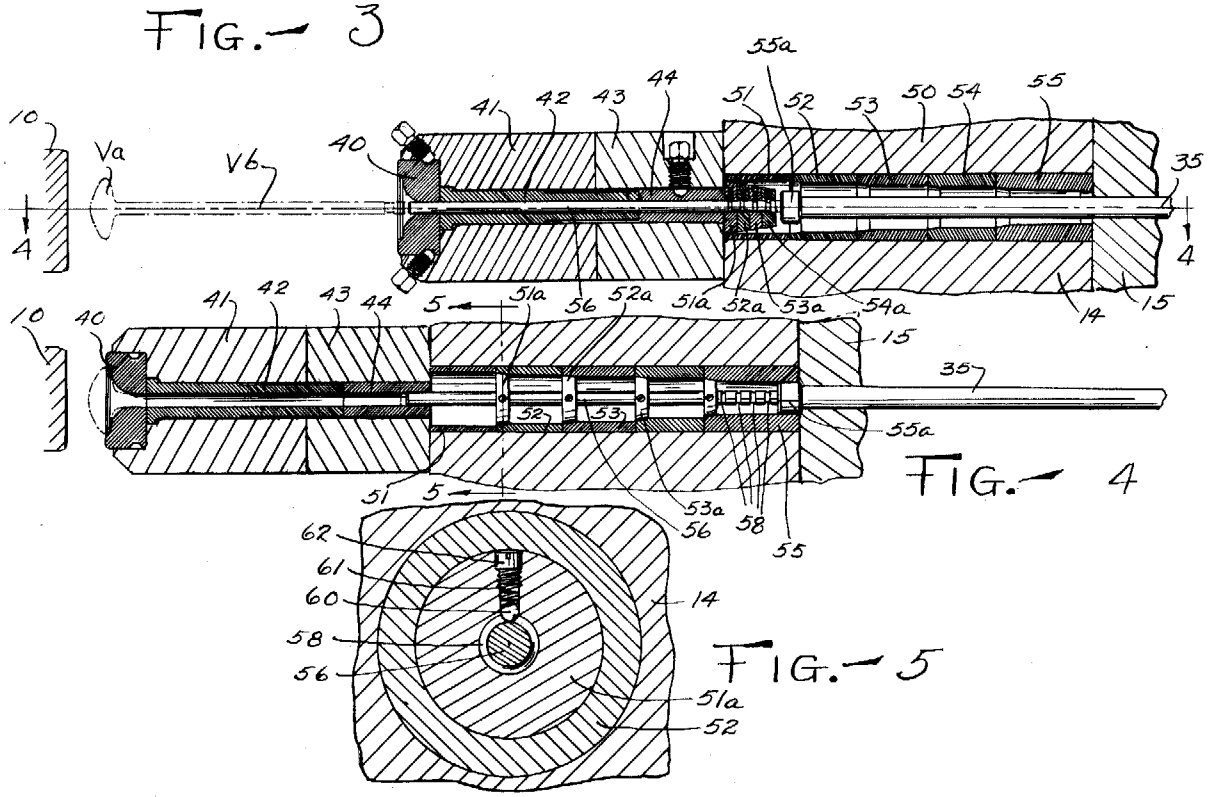
Inventor
William Henry Spire
By Bates, Golrick & Teare
Attorneys Reissued June 18, 1935

Re. 19,616

UNITED STATES PATENT OFFICE 19,616

METHOD OF AND APPARATUS FOR FORGING UPSET ARTICLES

William Henry Spire, Cleveland, Ohio, assignor, by mesne assignments, to The National Machinery Company, Tiffin, Ohio, a corporation of Ohio Original No. 1,856,440, dated May 3, 1932, Serial No. 358,032, April 25, 1929. Application for reissue February 25, 1933, Serial No. 658,633

9 Claims. (Cl. 78—17)

This invention is concerned with improvements in machines designed for the plastic forming of metals by the application of heavy pressures, and more particularly the invention is set forth in its present form as an adaptation to forging machines of the upsetting and heading types.

In manufacturing processes in which metal is forged or pressed to shape in a die by the action of a hammer or the like it is necessary to provide means for removing the article or blank from the die. For many classes of work it has been customary to use open dies in which the metal is acted upon, so that the die halves may be separated, permitting the work to be withdrawn. Wherever possible, however, it has been preferable to use solid dies in order to avoid the throwing out of a flash or fin along the parting line of the die sections, and also to avoid other difficulties attendant upon the use of open dies, such as the added complication and expense of the mechanism for operating the dies, inaccuracies in the work resulting from the spreading of the dies under the upsetting or forging pressure, and the like.

Where solid dies are used it has been customary to mount an ejector pin to slide axially through the die and push out the article at the completion of the upsetting or forging operation. In the case of machines for upsetting a head upon a rod or length of wire, such as in the manufacture of bolts and the like, it has been customary to construct the die as a cylindrical hole for receiving the shank portion of the blank, terminating at its forward end in a cavity of any desired shape to co-operate with the hammer, and open at its rearward end. A hardened steel ejector rod is slidably mounted in the cylindrical part of the die cavity. In its rearward position the rod serves to define and close the rear end of the die cavity, and when moved forwardly relative to the die serves to eject the blank or article from the die.

The ejector rod is ordinarily arranged to be pushed forwardly by an actuating rod of larger diameter than the pin. The diameter of the ejector rod is normally equal to the diameter of the cylindrical portion of the die which receives the shank and the stroke of the ejector rod is equal to the length of the shank portion of the die so that the rod may be moved forwardly the entire length of the die to insure freeing the articles therefrom. With this construction it is possible to provide a guide and supporting bearing for a portion of the ejector rod, but it is necessary to leave a length of the ejector rod equal to its stroke unsupported at the rear end when the ejector rod is in its rearward position, since the hole through which this part of the rod extends must be of sufficient diameter to permit the passage of the actuating rod which is larger in diameter than the ejector.

The ejector rod is frequently subjected to relatively large compressive forces, first at the time the upsetting or forging pressure is applied to the metal and second when the rod starts its forward motion to free the article from the die.

If the unsupported length of the ejector rod is too great in proportion to its diameter, the rod is apt to be buckled or broken from the forces applied to it. As a consequence the use of solid dies has been considerably limited and where the shank of the article to be produced is relatively long as compared with its diameter so as to necessitate leaving unsupported a relatively great length of the ejector rod, it has been necessary to use open dies rather than solid dies. Other efforts have been made to avoid the difficulty by allowing the shank of the article to extrude freely into the die cavity when the heading pressure is applied without abutting the end of the ejector, but these efforts have likewise been unsuccessful for long shanks, since the article is apt to freeze tightly in the dies and the pressure required to start it results in breaking the ejector rod. Furthermore, it is highly undesirable to allow the shank to extrude freely into the die without being supported at the rear end, since this results in inaccurate shank length. Moreover, with articles such as bolts, poppet valves and the like it is impossible to perform the initial upsetting operation upon the rod or wire stock unless the stock is held in some way as by abutting the ejector rod in a solid die or by being gripped in open dies.

Accordingly, the general object of the present invention is to extend the field of usefulness of solid dies in various types of presses and upsetting and heading machines by the provision of a novel ejector mechanism which will prevent the buckling and breaking of an ejector rod regardless of the relation between the diameter of the rod and the length of stroke. The invention is particularly adapted for application to upsetting machines or headers for the manufacture of bolts or poppet valves or the like, but may also be utilized in other types of upsetting or forging machines. The novel arrangement of the ejector mechanism also permits the use of the ejector rod to serve as the rear face of the die and receive the heading pressure so that the solid die and ejecting mechanism may be used for carrying out either the final forming operation of a bolt or poppet valve having a relatively long shank, the preliminary forming operations in which the metal may be gathered from a length of straight stock, or operations in which the metal is upset to final form from a straight length of stock in the same solid die.

Other objects of this invention are to provide means for supporting against buckling or breaking that portion of an ejector rod extending into a bore of larger diameter than the rod; providing supporting means for the rear end of the ejector rod when the rod is retracted which will not interfere with the reciprocation of an actuating rod of larger diameter than the ejector; and to provide collectible means for supporting an ejector rod which are automatically collected or collapsed to avoid interference with the actuating members during one portion of the cycle of movement of the rod and automatically redistributed to again support the ejector rod during another portion of the cycle of movement.

Other objects of my invention will hereinafter be set forth in the following description which refers to the accompanying drawings, illustrating two embodiments thereof applied to a machine for heading poppet valves or the like;

In the drawings:

Figures 3 and 4 are fragmentary cross sectional elevations showing a modified form of my invention, and Figure 5 is an enlarged cross sectional detail taken substantially along the line 5—5 of Figure 4.

My invention contemplates the lateral supporting of a kicker or ejector rod, in a bolt header or valve header, at several places along the length of the rod whereby the heretofore encountered difficulty of preventing the rod from buckling when subjected to an unusual compressive load, due to the work sticking in the die forms will be readily overcome. By thus supporting the rod laterally at several points I am able to prevent the starting of the bend in the rod and, accordingly the rod is maintained as a uniformly loaded column when under load.

Figure 2:
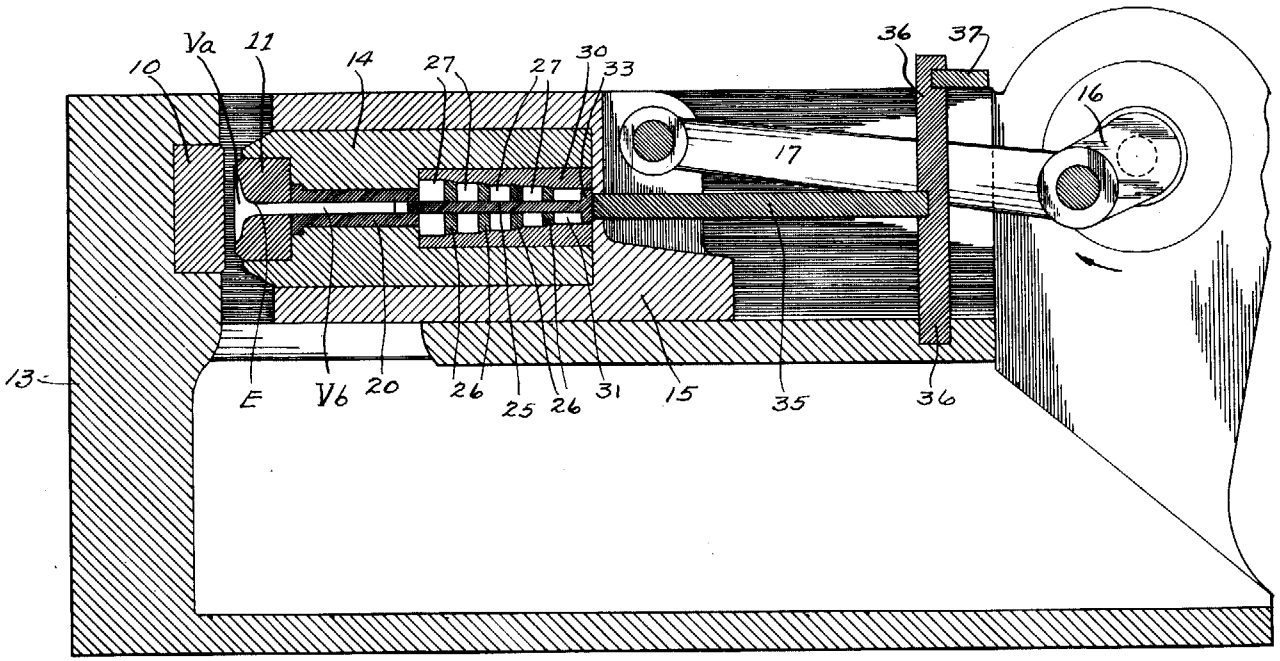
Figure 2 is a cross sectional side elevation taken through the header substantially along the line 2—2 of Figure 1 and illustrating one form of my invention.

In Figure 2 of the drawings, in cross section I show for the purpose of illustration and not in limitation thereof, my invention as applied generally to an upsetting machine illustrated as being equipped with a stationary forming anvil 10, a die 11, the anvil 10 being rigidly mounted upon a heavy machine frame 13 and the forming die 11 being positioned within a head block 14. The head block 14 is usually mounted upon a slide or gate 15, the gate being reciprocated by a crank 16 through a connecting rod or pitman 17, the crank 16 being rotated by a source of power applied to gears or fly wheels 18 in any suitable manner.

It will be understood, of course, that the invention is equally applicable to a cold header or other form of upsetting or forging machine in which the forming die is normally mounted in the machine frame or bed frame and the anvil or hammer is carried by the reciprocating slide.

Figure 1:
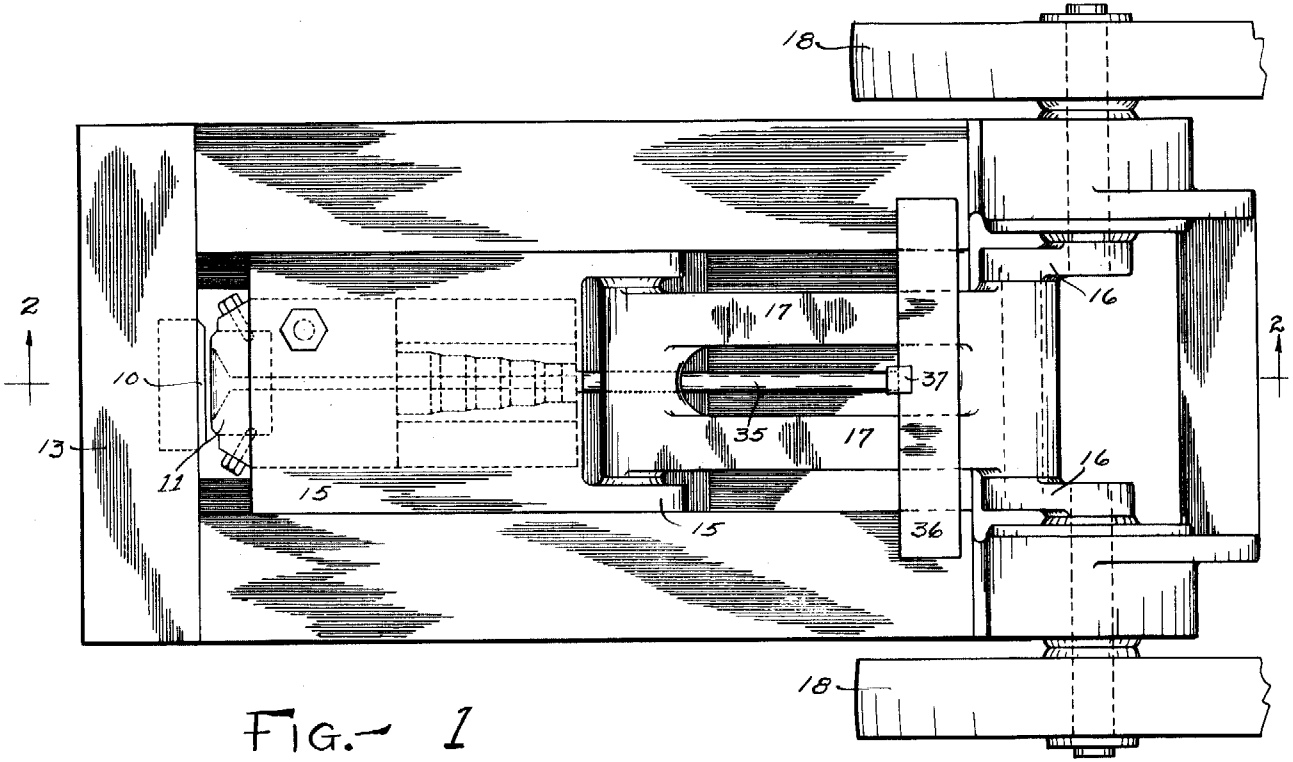
Figure 1 is a plan view of a valve header machine equipped with my invention.

The header machine illustrated in Figures 1 and 2 and forming die 11 are particularly designed for the forming of a semi-formed valve head V*a*, on a shank V*b* to produce a single piece automotive valve member; the semi-formed head portion V*a* being usually pre-formed or gathered to conform to the dot and dash shape shown in Figure 3. The forming die 11 has a bore therein conforming to the diameter of the shank portion V*b* of the valve and a removable sleeve 20, carried by the head block 14, may be considered as part of the forming die 11 in the present illustration.

In Figure 2 I show an ejector rod 25 which in the usual installation in this type of machine is suspended on a suitable supporting medium attached to the machine frame in a position to clear the reciprocating movements of the slide 15. In the present instance, however, the ejector rod is supported by a series of annular bearing members 26 formed within a sleeve 30 concentrically arranged within the head block 14. The end 31 of the bore is of suitable diameter to slidably support the rear enlarged annular head end 33 of the ejector rod 25. The head 33 abuts a stop rod, or actuating rod, 35 of relatively large diameter compared to the diameter of the ejector rod 25 and the stop rod 35 may be supported by any suitable bridge work such as members 36 and 37 (see Figures 1 and 2) secured to the machine frame at the end of a slideway formed therein to support the reciprocating slide member 15.

In other types of machines, in which the die member is mounted in the stationary bed frame instead of being mounted in the slide, the rod corresponding to the rod 35 is reciprocated by any suitable means to actuate the ejector rod. It will be understood, of course, that the action is essentially the same as in the type of machine illustrated, since in either event the net result is relative slidable movement of the kicker rod and the block 14.

The annular bearing members 26 are slidably disposed upon the rod 25 at spaced intervals and bear against the sleeve 30 when the rod is in its retracted position to support the rod against lateral bending or buckling. When relative movement between the rod 25 and the head block 14 occurs it will be evident that the bearing members 26 may be collected with a relatively short space in engagement with the enlarged head 33. Suitable means are provided to redistribute the bearing members when the head again moves forward or the rod is retracted. In the illustrated embodiment redistribution of the bearing members is effected by constructing the members of different diameters so that the smallest is adjacent the head 33 and the remainder increase progressively in diameter. The bore 27 of the sleeve 30 is similarly provided with portions increasing in diameter from the rearward end toward the forward end and the bore 27 and the bearing members 26 are provided with complementary seating surfaces spaced at the desired intervals. This arrangement, however, is merely illustrative and it will be understood that any suitable arrangement may be employed for effecting redistribution of the bearing members during each cycle of the machine.

The operation of this arrangement is as follows: A work blank or valve stem is inserted in the bore of the die member 11 when the slide 15 is moving forwardly from the right to the left in Figures 1 and 2, (this operation usually being effected automatically) and as the crank 16 revolves to the left horizontal position the head V*a* is forced against the anvil block 10, thus causing the end of the valve stem V*a* to be compressed to the final valve head form. This operation causes some elongation of the valve stem portion Vb by an extruding action which takes place at the point E (see Figure 2).

This extruding action will vary depending upon variations in the metallurgical conditions of the metal comprising the valve body and the temperature thereof at the time of forming but the amount of extrusion in the present instance is limited by reason of the fact that the ejector or kicker rod 25 is of sufficient length to have the forward end thereof disposed within the bore of the sleeve 20 to limit the extent of extrusion of the valve stem. Thus when a predetermined amount of extrusion of the stem causes the right end of the stem to abut the end of the ejector rod 25 any remaining surplus metal in the head portion V*a* of the valve will be caused to form a flash thereon about the perimeter of the valve head.

Upon the completion of this forging and extruding operation the kicker rod 25 acts to eject the valve stem from the bore of the die member 11 and 20, and as the sleeve 30 and annular bearing members 26 move to the right with the die block they are caused to gather when they contact with each other and the head 33 of the kicker rod. When the slide mechanism reciprocates from right to left these annular members are caused to be properly disposed longitudinally along the kicker rod as illustrated, by reason of the variation in their diameters and the variation of the diameter of the bore of the sleeve 30.

In Figures 3, 4 and 5, I illustrate a modified and more refined manner of adapting my invention to valve headers of the present industrial type. In this construction the valve die 40 is removably mounted in a suitable counter bore formed in a head block 41, the head block being bored to receive a removable die liner or die extension sleeve 42 and die members 40 and 42 having aligned bores therein conforming to the diameter of the valve stem with only slight tolerance thereover. An extension 43 of the head block 41 is provided with an extension 44 in alignment with the die sleeve 42, whereby the several parts just described may be readily removably assembled within the slide 15 of the header illustrated in Figure 2. The sleeve member illustrated in the construction, as shown in Figure 3 in the present instance will comprise a sleeve member 50 having a bore of uniform diameter therein to receive a series of small sleeve members 51, 52, 53, 54 and 55 of uniform outside diameter but of varying inside diameters, and which sleeve members coact with the annular members 51*a*, 52*a*, 53*a*, 54*a* respectively, and the head 55*a* of the kicker rod 56 to effect positioning of the members 51*a*, 52*a*, etc. I find this construction quite adaptable to the present day form of valve and bolt headers. This construction, of course, is equally well adapted for use on other types of headers such as cold headers for bolts or the like in which the die member is mounted on the stationary bed frame and the cooperating anvil or hammer is carried by the slide.

In this construction I also provide as shown in Figure 5 a retaining means for each of the annular members 51*a*, etc., which may be in the form of ball members 60 disposed within a radial bore formed within each of the annular members and which are acted upon by a spring 61 retained within the radial bore by any suitable means such as small screw members 62. The end of the kicker rod 56 adjacent the head 55*a* thereof is provided with suitably disposed grooves 58 (see Figure 4) in which the ball members 60 will be forced to seat when the slide 15 is in the extreme left position (see Figures 2 and 3), and as the slide 15 moves from the right to the left these annular members will be retained in the collected position shown in Figure 3 until the corresponding tapered shoulders on the sleeves 52, 53, etc. contact with the annular coni-form surfaces thereof, and when the slide has reached the extreme right position the kicker rod 56 will be accurately laterally supported as shown in Figure 4. This construction is preferable in instances to the arrangement shown in Figures 1 and 2 in which the annular members are retained in collected position until engaged by the corresponding shoulders solely by the friction between the annular members and the rod 25. Particularly in the type of machine in which the die is mounted in the bed frame and the kicker rod reciprocates therein it is preferable to employ locking members to prevent the displacing of the annular members by inertia or any other redistributing arrangement which acts more positively than the arrangement shown in Figures 1 and 2.

From the foregoing description of two adaptations of my invention it will be seen that I have provided a mechanism which is simple in its mode of operation and is readily adaptable to the dimensional confines of the die blocks of header machines whereby it may be used in substitution of the present form of kicker rods and kicker mechanisms, and even though the kicker rod is of relatively small diameter as compared to that of the required length thereof the rod nevertheless can be laterally supported at any desired number of longitudinal points whereby extreme compressive loads may be exerted upon the end thereof. It follows that I am thus utilizing the kicker or ejector rod as a closure for the bottom of the forming die without causing distortion and buckling of the kicker rod and I can therefore predetermine the amount of extrusion of the head metal into stem formation or the distance the stock is initially inserted into the dies. This result overcomes a great deal of material waste from the stem end of each valve piece when the ends are precision finished by a grinding operation. This arrangement is also particularly desirable for cold headers or similar upsetting machines for the manufacture of bolts or the like and also for dies in presses or other compression machines in which a stationary length of stock is upset or headed and in which the upsetting pressure is transmitted directly to the ejector or kicker rod.

It will be apparent also to those skilled in the art that the present form of my invention may be considerably varied to adapt the same to various press, upsetter or header constructions where work of shapes and contours quite different than bolts and automobile valves are being formed.

I claim:

1. In an apparatus of the character described, the combination of a reciprocating die head, an ejector member adapted to eject work pressed into a cavity formed in the die head, said ejector member at all times disposed within and forming the end of the die cavity and receiving the thrust of the blank when subjected to working strains, means shiftable relative to the die for laterally supporting the ejector member when said member is subjected to working strains, and means for repositioning said shiftable means.

2. In a header machine, the combination of a movable die head a cavitary die member fixed thereto having a bore extending therethrough, stationary work ejecting means extending into said bore and forming the end of the die cavity, means shiftable relative to the die for reinforcing the work ejecting means when the work ejecting means is caused to act upon the work in the cavity of said die, and means for repositioning said shiftable means.

3. An apparatus of the character described comprising a reciprocating die head, a die carried thereby having an elongated cavity for the reception of a piece of work having a shank of substantially the same diameter as said elongated cavity, means for reciprocating said die head, an ejector member carried by the reciprocating means, said ejector member at all times disposed within the end of said cavity to form the end of same and receive the forging thrust of the work piece and a series of collectible bearing members for laterally bracing said member during the forging stroke of said reciprocating means, and means for repositioning said collectible bearing members.

4. In an apparatus of the class described, the combination of a die, a relatively thin member for ejecting work formed in the die, means for reinforcing said ejecting member against bending comprising a sleeve having a series of tapered shoulders of progressively varying diameters, a corresponding number of collectible annular members adapted to engage said ejecting member and said shoulders, and spring means for retaining each of said annular members in collected position on said ejector member until each of said annular members is engaged by the corresponding shoulder of the sleeve.

5. In an apparatus of the character described, the combination of relatively movable members comprising a reciprocating slide and a bed frame, a die mounted in one of said members arranged to receive a piece of metal to be formed by pressure from the other of said members, said die including a substantially cylindrical opening constituting a holding portion for the piece, a bore formed in said one member communicating with said opening and having a larger diameter, an ejector rod slidably fitting in said cylindrical opening and extending into said bore, said ejector rod at all times disposed within and forming the end of the die and receiving the forging thrust of the piece while the piece is being worked, an actuating rod for said ejector rod having a greater diameter than the ejector rod extending into said bore and engaging said ejector rod, said actuating rod and said one member being relatively reciprocable, bearing means shiftably mounted on said ejector rod and within said bore and arranged in position to laterally support said ejector rod during the forging thrust at a point intermediate its length and to be shifted from said position to permit the entrance of said actuating rod into said bore, said bearing means being arranged to be automatically repositioned when said ejector rod is returned to its initial position.

6. In a header machine, the combination of a cavitary die member having a bore therethrough, work ejecting means extending into said bore, said die and said work ejecting means being relatively movable, said work ejecting means at all times disposed within the bore and being subjected to a direct axial thrust from the work during the forging of the work and shiftable means for reinforcing the work ejecting means while subjected to said axial thrust arranged to be shifted and collected together when said die and work ejecting means are moved relative to cause the work ejecting means to enter said bore to eject work in the cavity of said die, said shiftable means being arranged to be automatically repositioned when said work ejecting means is retracted.

7. In an apparatus of the character described, the combination of relatively movable members comprising a reciprocating header slide and a bed frame, a die fixed in one of said members, an ejector adapted to eject work pressed into a cavity formed in said die, said ejector being at all times supported at the end adjacent the die by extension into said die, said ejector being supported at its opposite end and said ejector being supported against lateral flexing intermediate its ends.

8. In an apparatus of the character described, the combination of relatively movable members comprising a reciprocating header slide and a bed frame, a die fixed in one of said members, an ejector adapted to eject work pressed into a cavity formed in said die, an ejector cavity adjacent said die cavity, said ejector movable within said die from a forging position to an ejecting position, means to support said ejector in said forging position comprising, one end portion of the ejector extending within and braced by the walls of the die cavity, the opposite end supported by the walls of said ejector cavity and the portion intermediate said two ends braced against lateral deflection by a means independent of and movable with respect to said end supports.

9. In an apparatus of the character described, the combination of relatively movable members comprising a reciprocating header slide and a bed frame, a die fixed in one of said members, an ejector adapted to eject work pressed into a cavity formed in said die, said ejector being at all times supported at the end adjacent the die by extension into said die, said ejector being supported at its opposite end, said ejector supported against lateral flexing intermediate its ends by a member movable with respect to said ejector and die, said member and ejector provided with co-operating means to reposition the member intermediate the ends of the ejector.

WILLIAM HENRY SPIRE.